US012201576B2

(12) United States Patent
Liu et al.

(10) Patent No.: US 12,201,576 B2
(45) **Date of Patent: *Jan. 21, 2025**

(54) SYSTEM, METHOD, AND NON-TRANSITORY STORAGE MEDIUM FOR PROVIDING ONLINE ENTERTAINMENT IN ASSOCIATION WITH AN INTERACTIVE ADULT TOY

(71) Applicant: HYTTO PTE. LTD, Singapore (SG)

(72) Inventors: Dan Liu, Guangzhou (CN); Jilin Qiu, Guangzhou (CN)

(73) Assignee: HYTTO PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,777

(22) Filed: Jun. 12, 2023

(65) Prior Publication Data

US 2024/0033171 A1 Feb. 1, 2024

Related U.S. Application Data

(63) Continuation of application No. 17/877,770, filed on Jul. 29, 2022, now Pat. No. 11,712,397.

(51) Int. Cl.
*A61H 19/00* (2006.01)

(52) U.S. Cl.
CPC ............. *A61H 19/40* (2013.01); *A61H 19/30* (2013.01); *A61H 2201/5012* (2013.01); *A61H 2201/5071* (2013.01); *A61H 2201/5082* (2013.01); *A61H 2201/5084* (2013.01)

(58) Field of Classification Search
CPC ........ A61H 19/00; A61H 19/30; A61H 19/40; A61H 2201/5012; A61H 2201/5071; A61H 2201/5082; A61H 2201/5084
See application file for complete search history.

(56) References Cited

U.S. PATENT DOCUMENTS

| | | | | |
|---|---|---|---|---|
| 9,762,515 | B1 | 9/2017 | Olivares et al. | |
| 11,134,041 | B1 | 9/2021 | He | |
| 11,311,453 | B2 | 4/2022 | Liu | |
| 2006/0079732 | A1* | 4/2006 | Blumenthal | G06F 3/011 600/38 |
| 2015/0057493 | A1* | 2/2015 | Harris, Jr. | G06F 16/43 340/407.1 |
| 2017/0296424 | A1* | 10/2017 | Hsieh | A61B 5/4368 |

OTHER PUBLICATIONS

"Lovense launches Mission—A G-spot Depth-Controlled Vibrator", URL: https://lovensefan.com/lovense-mission-launch/ pp. 1-4, accessed on Jul. 27, 2022.

* cited by examiner

*Primary Examiner* — Samuel G Gilbert
(74) *Attorney, Agent, or Firm* — Holtz, Holtz & Volek PC

(57) ABSTRACT

An online entertainment system for facilitating interaction between a model hosting an online streaming video session and at least one viewer. The model operates an operable adult toy with which the at least one viewer can interact, either directly or indirectly, during the online streaming video session. The system provides the viewer with an interface with which the viewer can engage to participate in a game of chance. A result of the game of chance is used to obtain predetermined feedback parameters, actual feedback obtained from the adult toy during manipulation thereof by the model is compared against the predetermined feedback parameters, and control is performed based on a result of the comparison.

20 Claims, 8 Drawing Sheets

SYSTEM, METHOD, AND NON-TRANSITORY STORAGE MEDIUM FOR PROVIDING ONLINE ENTERTAINMENT IN ASSOCIATION WITH AN INTERACTIVE ADULT TOY

CROSS-REFERENCE TO RELATED APPLICATIONS

This application is a Continuation Application of U.S. application Ser. No. 17/877,770, filed Jul. 29, 2022, now U.S. Pat. No. 11,712,397, issued Aug. 1, 2023, the entire content of which is incorporated herein by reference.

BACKGROUND

1. Field

The present invention relates to an interactive adult toy, and a system and method using the same.

The use of adult toys (also referred to as sex toys) by an individual or a group of individuals, irrespective of gender, to achieve sexual stimulation is known. Such adult toys may include a vibration feature which may be used by the individual or group of individuals to provide stimulation. In conventional adult toys, a single setting of stimulation (e.g., vibration) is manually controlled by the user (e.g., by operation of an on/off switch). However, as these conventional adult toys are typically self-operated by an individual for experiencing stimulation by using a single vibration setting, the individual may not always feel the same level of stimulation each time the adult toy is used. Additionally, the arousal of the individual may change periodically based on mood and environment, and thus the stimulation produced by the adult toy having a single vibration setting may not be satisfying.

Recently, social media, broadcast online streaming, and the ability to extend hardware interfaces via local and wide area networking have contributed to the configurability of adult toys. These technologies provide a level of customization to the needs of the individual or group of individuals to experience sexual stimulation without direct physical contact between the individuals.

2. Related Art

A technique for allowing one or more viewers to interact with a model (performer) is known. For example, U.S. Pat. No. 9,762,515 describes a system which enables viewers to “tip” a model during an online video chat session hosted by the model, wherein the host can define tipping parameters for performing predefined acts, with use of an adult toy, based on the amount of tips received. The adult toy can be wirelessly enabled (e.g., by Wi-Fi or Bluetooth™) to receive commands directly from a server via a web browser extension, or from a website hosting an online video chat session. The adult toy may also be configured to connect to an application installed on a device operated by the host, wherein the application communicates with the web browser extension to relay commands to the adult toy. The browser extension or website may also be able to generate live control links to enable certain users have a live control of the host’s adult toy.

U.S. application Ser. No. 16/352,876 describes a method for using an interactive sex toy with sensory feedback, which may include receiving physical pressure readings from an interactive sex toy with sensory feedback at a first device, converting the physical pressure readings to pressure parameter instructions, transmitting the pressure parameter instructions to a second device, and actuating a sex toy with the pressure parameter instructions.

SUMMARY

According to one embodiment, a system, method, and non-transitory computer-readable recording medium provide online entertainment via an online platform, in association with an interactive adult toy operated by a model hosting a live online streaming video session, which can improve interaction between the model and at least one viewer of the streaming video session.

DETAILED DESCRIPTION

Figure 1:
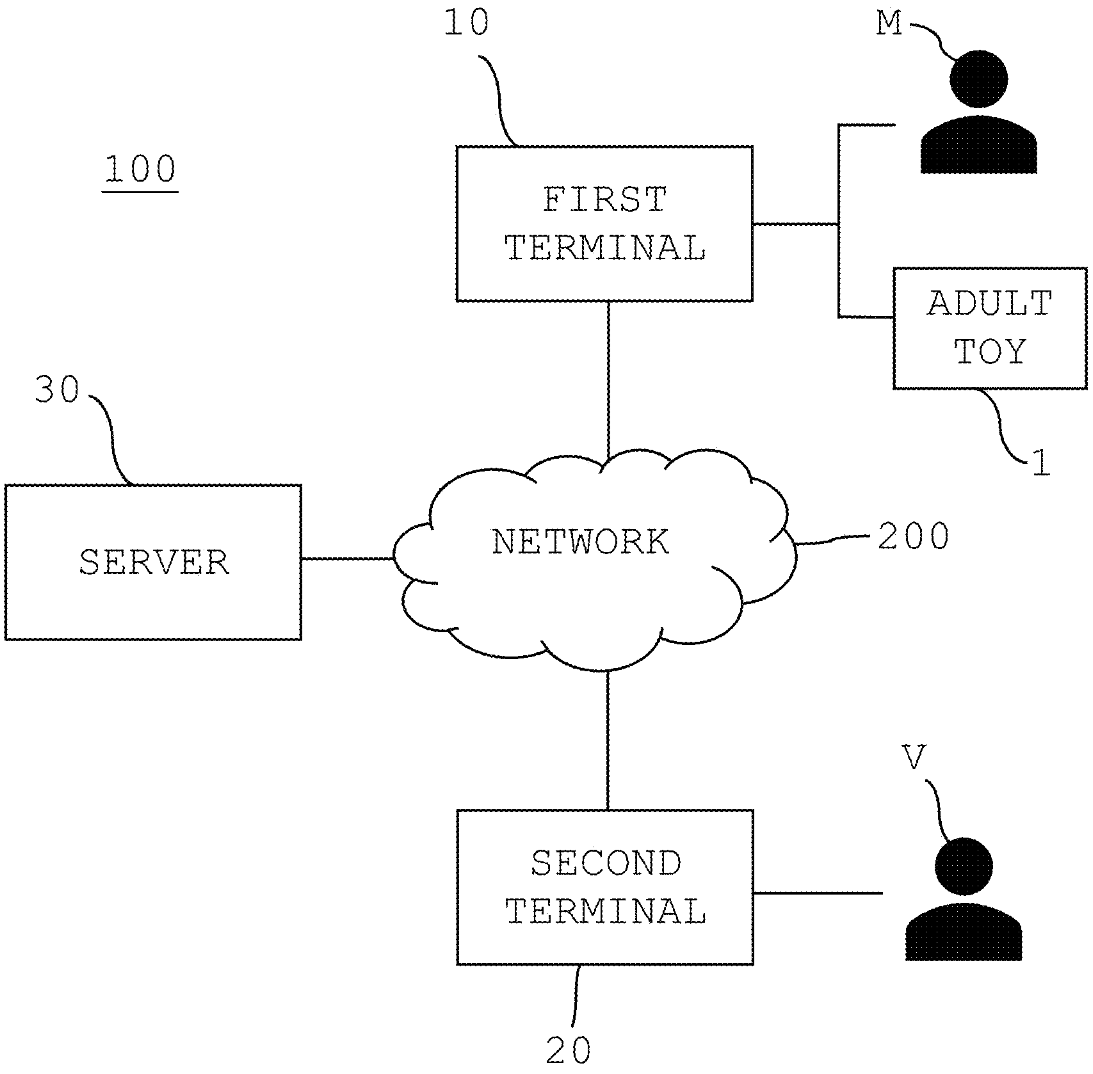
FIG. 1 is a block diagram illustrating an overall configuration of a system according to an embodiment.

Hereinafter, embodiments of the present invention are described with reference to the drawings in which the same reference numerals are given to the same or corresponding portions.

FIG. 1 is a block diagram showing an exemplary configuration of the system 100. As shown in FIG. 1, the system 100 includes an interactive operable adult toy 1, a first terminal 10, a second terminal 20, and a server 30, wherein the first terminal 10, the second terminal 20, and the server 30 are connected via a network 200 (e.g., the Internet). The interactive adult toy 1 and the first terminal 10 are operable by a model M (also referred to herein as a performer, host, or streamer) to provide a live streaming video via an online platform, and the second terminal 20 is operable by a viewer V. For example, the live streaming video may be provided via a website, or via an application installed on one or more terminals. The interactive adult toy 1 is communicably connectable to the first terminal 10. While a single viewer V is shown in FIG. 1 for the sake of clarity, a plurality of second terminals 20 may be provided which are operable by a plurality of viewers V(1) to V(n), such that the live streaming video provided by the model M is viewable by the plurality of viewers V(1) to V(n) simultaneously.

Figure 2:
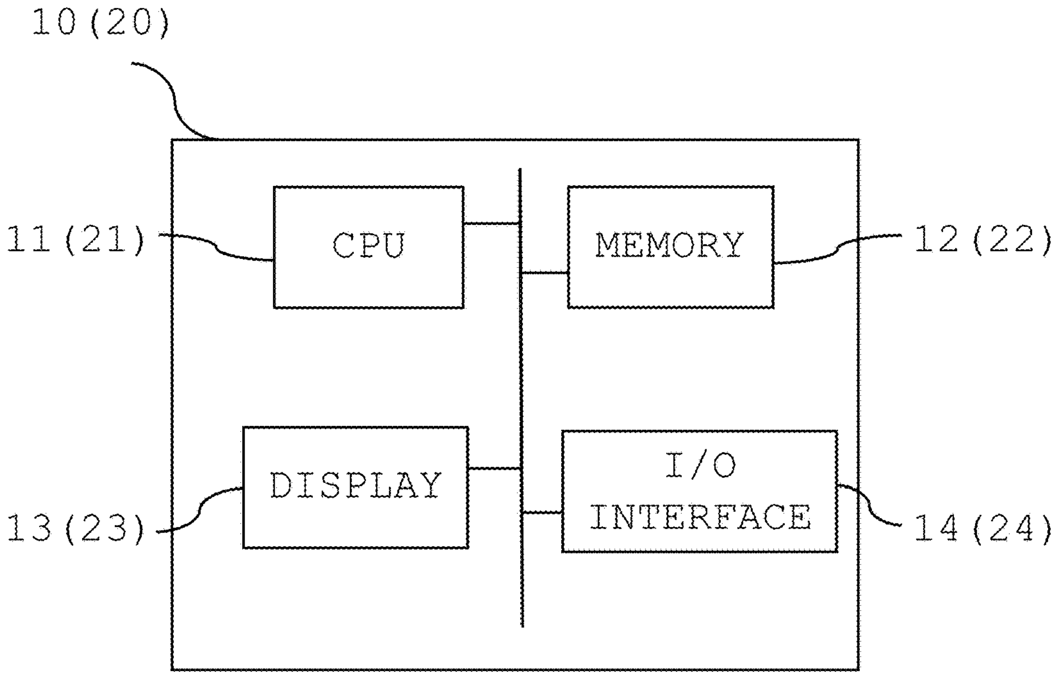
FIG. 2 is a block diagram illustrating a hardware configuration of a user-operable terminal provided in the system.

FIG. 2 is a block diagram illustrating an exemplary configuration of the first terminal 10 (the second terminal 20 is configured in a similar way). As shown in FIG. 2, the first terminal 10 includes a hardware processor (CPU) 11, a memory 12, a display 13, and an input/output (IO) interface 14. Similarly, the second terminal 20 includes a hardware processor (CPU) 21, a memory 22, a display 23, and an input/output (I/O) interface 24. For example, each of the first terminal 10 and the second terminal 20 may each be configured as one of a computer (e.g., a desktop or laptop computer), a mobile device (e.g., smartphone or tablet), a video game console, and the like.

Figure 3:
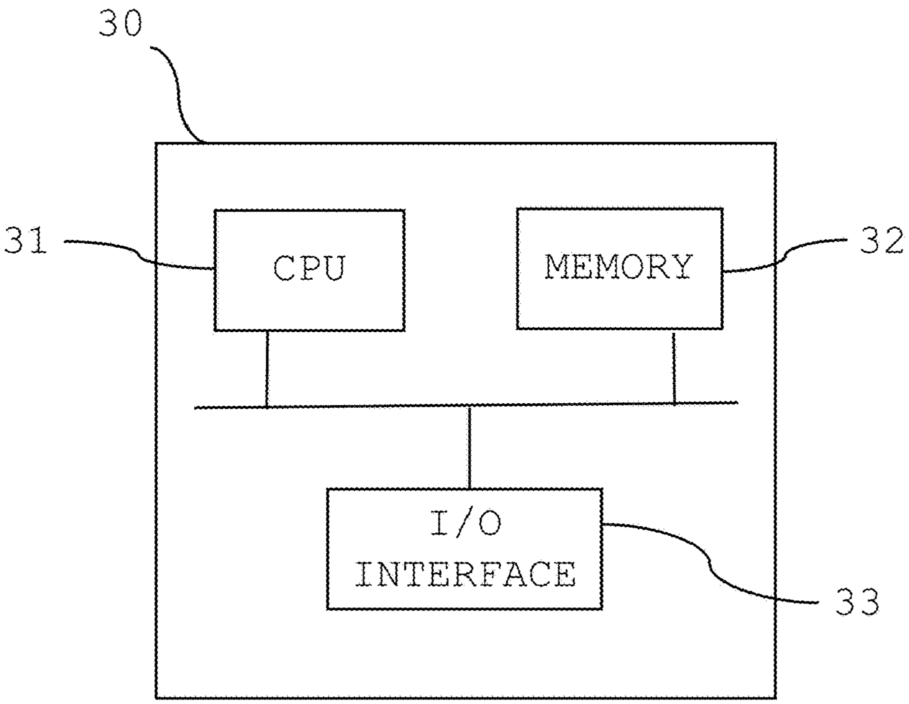
FIG. 3 is a block diagram illustrating a hardware configuration of a server provided in the system.

FIG. 3 is a block diagram showing an exemplary configuration of the server 30. As shown in FIG. 3, the server 30 includes a hardware processor (CPU) 31, a memory 32, and an input/output (IO) interface 33. The CPU 31 is configured to execute various processes, discussed in further detail below, under control of a program stored in the memory 32. While in the present embodiment the hardware processor is configured by a CPU 31, an embodiment in which the hardware processor is configured as a standalone processing circuit is also envisaged.

Figure 4:
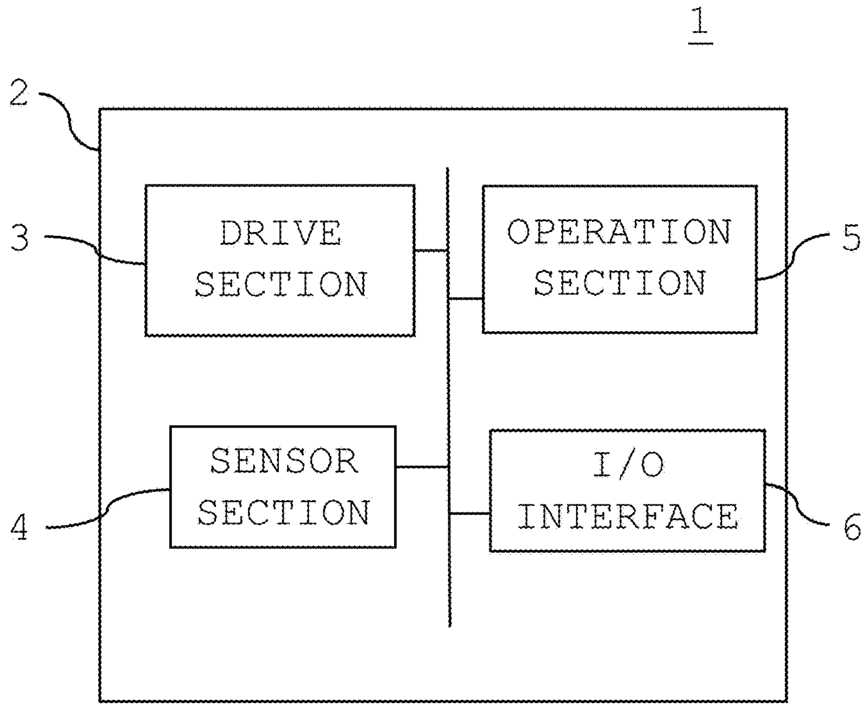
FIG. 4 is a block diagram illustrating a hardware configuration of a user-operable interactive adult toy provided in the system.

FIG. 4 is a block diagram showing an exemplary configuration of the adult toy 1. The adult toy 1 is operable by an individual for the purpose of sexual stimulation. In an embodiment, the adult toy 1 is configured to be insertable into a body part of a user (e.g., the model M). As shown in the block diagram of FIG. 4, the adult toy 1 includes a main body 2 accommodating a drive section 3, a sensor section 4, an operation section 5, and an input/output (IO) interface 6. The drive section 3 drives various drive operations for which the adult toy 1 is configured. The drive operations driven under control of the drive section 3 may include, but are not limited to, vibration, rotation, swinging, inhalation, temperature variation, expansion, suction, light output, and contraction, and may be driven either separately or in combination. The sensor section 4 is configured as one or plural sensors configured to obtain various sensing data regarding the adult toy 1 during manipulation thereof by the model M. For example, the sensor section 4 may include one or more of a tactile sensor, a pressure sensor, a depth sensor, a thermometer, and an acceleration sensor, and be configured to output respective sensing data collected by these sensors (e.g., tactile data, pressure data, depth data, temperature data, reciprocating speed data, and data regarding a number of reciprocations). The operation section 5 is operable by the user of the adult toy 1 to control functions thereof (e.g., on/off of the adult toy 1, setting a drive intensity of the above-described drive operations, and the like). The IO interface 6 is configured to send and receive signals by wireless communication, such that the adult toy 1 is controllable by signals received, and such that the adult toy 1 is capable of outputting results obtained by the sensor section 4 thereof. For example, the adult toy 1 may be configured to communicate with another device (e.g., the first terminal 10) by wireless communication (e.g., short range communication). The short range communication may include, but it not limited to, Wi-Fi, Bluetooth™, ZigBee, NFC, and IrDA. The adult toy 1 may be configured such that a size of the main body 2 thereof can be enlarged/decreased. For example, the main body 2 of the adult toy, or a portion thereof, may be selectively inflatable and deflatable. In an alternate embodiment, the main body 2 of the adult toy 1 may be configured to receive a body part of a user thereof.

The adult toy 1 may be provided with variable intensity settings (e.g., different intensity levels of the output of the drive section 3, such as vibration levels, rotation speeds, expansion sizes, and the like), which are manually adjustable by the model M via the operation section 5 or via an external application provided on the first terminal 10 with which the adult toy 1 is in wireless communication.

According to an embodiment, during an online video streaming session, the viewer V is able to interact with the model M (e.g., by text and/or by voice), and is further able to interact with the adult toy 1 operated by the model M, either directly or indirectly, via various user interfaces provided thereof, as discussed in further detail below.

Figure 5:
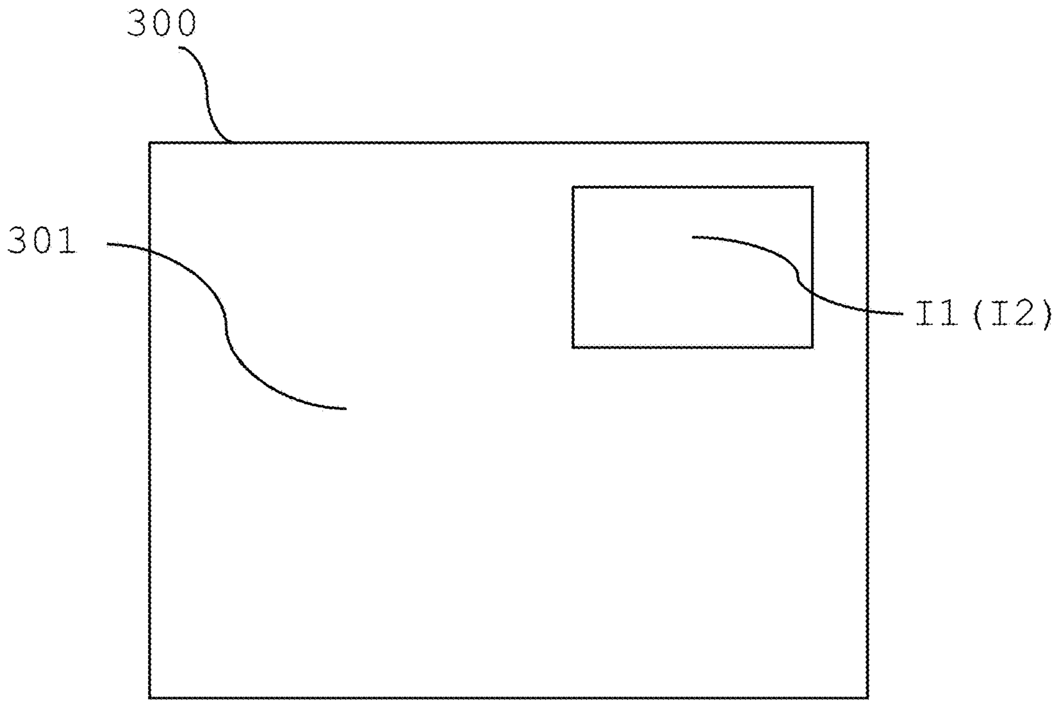
FIG. 5 schematically illustrates an exemplary screen provided during a live online video streaming session.

FIG. 5 schematically illustrates an exemplary session screen 300 provided to the viewer V at the second terminal 20 (e.g., at the display section 23 of the second terminal 20) during a live online video streaming session hosted by the model M. In the example of FIG. 5, the session screen 300 includes at least a streaming portion 301, in which a live video stream provided by the model M is displayed, and a first user interface I1, with which the viewer V can interact during the online video streaming session to engage in a game of chance. The first user interface I1 may be replaced by a second user interface I2 during engagement with the game of chance, as discussed in further detail below.

The first user interface I1 and the second user interface I2 may be presented to the model M operating the adult toy 1 during the online video streaming session (e.g., to the first terminal 10), and/or to the viewer V of the online video streaming session (e.g., to the second terminal 20), during the online video streaming session hosted by the model M. Each of the first interface I1 and the second interface I2 is presented in the session screen 300 as a component of the online video streaming session. As noted above, and as discussed in further detail below, the first and second interfaces I1, I2 are provided to the viewer V to enable the viewer V to engage in a game of chance, the result of which can be used to perform control of the adult toy 1 operated by the model M.

According to an embodiment, the viewer V may be provided with the ability to directly contribute (tip) one or more virtual tokens (virtual currency or virtual gifts) to the model M during the online video streaming session, by way of the first interface I1. In particular, the viewer V may be provided with the ability to utilize the virtual token(s) to participate in the game of chance (e.g., by the viewer V contributing a number of virtual token(s) that falls within a token range preset by the model M to enable participation in the game of chance). The results of the game of chance can be used to control the adult toy 1 operated by the model M, by controlling the adult toy 1 directly or by directing the model M to control the adult toy 1 in a certain manner.

Figure 6:
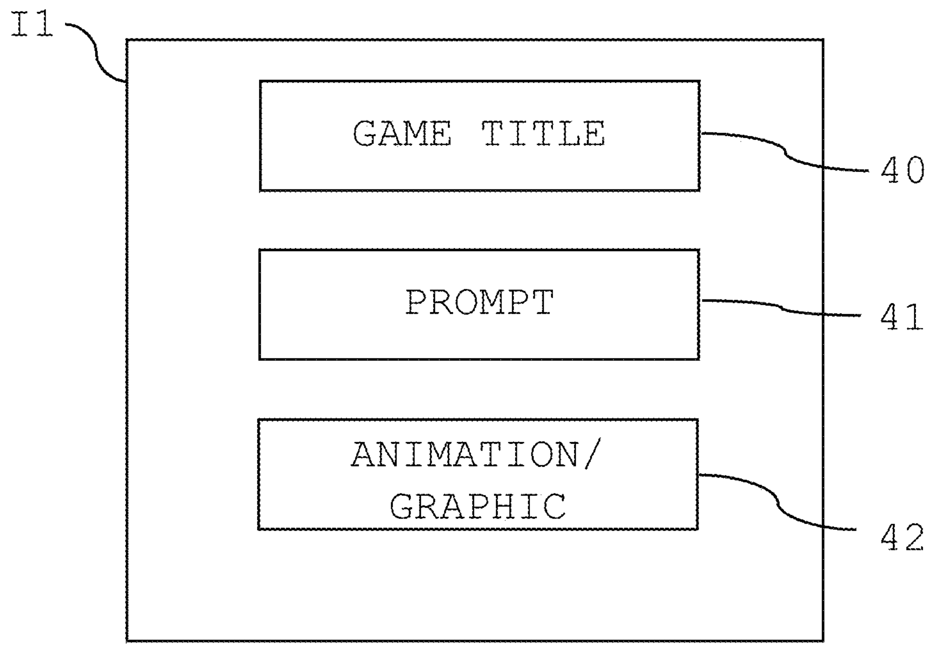
FIG. 6 schematically illustrates a first interface provided by the system.

FIG. 6 schematically illustrates an example of display components included in the first interface I1 provided to the viewer V by the system 100. The first interface I1 enables the viewer V to engage in a game of chance. According to an exemplary embodiment, the game of chance provided in the first interface I1 is a virtual bowling game in which a certain number of pins are "knocked down" in response to input of a parameter by the viewer V. For example, the input parameter may be an amount of tip (e.g., number of virtual tokens) input by the viewer V to engage in the game of chance. As discussed further below, the result of the game of chance, when played, is generated randomly. When the viewer V engages in the game of chance by inputting a required input parameter (e.g., a tip of 20 tokens), an associated output result is determined from having engaged with the game of chance. The required input parameter to engage in the game of chance may be set by the model M to be a specific value (e.g., 20 tokens), and/or a range (e.g., a range of 15-25 tokens).

Table 1 set forth below illustrates exemplary relationships between possible output results for a bowling game when a required input parameter (e.g., a tip amount of 20 tokens) is input by the viewer V to engage in the game of chance; here, the particular tip value and values set forth in Table 1 are intended to be illustrative, and specific values may be set as appropriate depending on the game of chance to be played. In an exemplary embodiment, the information in Table 1 is stored in the memory 32 of the server 30; however, the present invention is not limited to this configuration, and the information of Table 1 can be stored at any suitable location accessible by the server 30. Further, certain values within the Table 1 may be configurable by the model M (e.g., the model M may also be provided the ability to control the probabilities of the various possible output results). In this connection, while a bowling game is discussed herein as exemplary of the game of chance, other games are envisaged as being included within the scope of this disclosure as long as the game can randomly generate one of plural predictable results. For example, the game of chance may include, but is not limited to, the above-described bowling game, a dice game, a roulette game, etc.

TABLE 1

| Score | Depth | Intensity/ Play Time | Probability |
|---|---|---|---|
| 1 pin | 1/4 | 5 seconds | High |
| 2 pins | 1/4 | 10 seconds | High |
| 3 pins | 1/2 | 15 seconds | Medium |
| 4 pins | 3/4 | 20 seconds | Medium |
| 5 pins | 4/4 | 25 seconds | Low |
| 6 pins | 4/4 | 27 seconds | Low |

As described above, a given input parameter (e.g., a tip of 20 tokens) enables participation in a game of chance, an output result (score) of which is randomly determined based on probability. In the example set forth in Table 1, the viewer V has a chance of receiving a score of 1, 2, 3, 4, 5, or 6 pins in response to input of the input parameter. Each output result is associated with a respective probability of occurrence; for example, as shown above, a lower score has a higher probability of occurring (and vice versa). Moreover, each output result is associated with at least one predetermined feedback; that is, a manner in which the adult toy 1 is to be controlled and/or operated. In the example of Table 1, a score of 1 pin is associated with a predetermined feedback whereby the adult toy 1 is inserted into a body part of the model M at a minimum insertion depth for a minimum insertion time, whereby the insertion operation of the toy and the duration of the insertion are controlled by the model M. The insertion depth and insertion time may increase in accordance with an increase in the score. While the predetermined feedback is described above with respect to different levels/ranges (e.g., depth, time, intensity) of a specific act using the adult toy 1 (e.g., insertion, vibration), other types of feedback are also envisaged. For example, predetermined feedback associated with the use of different adult toys 1 (e.g., toys having different stimulating capabilities), different acts using the adult toy 1 (e.g., insertion into different body parts of the model M, inflation within a body part of the model M, vibration against an external body part of the model M, intensity of driving performed by the drive section 3, obtaining output from the sensor section 4 provided in the adult toy 1, and the like) are also envisaged.

That is, in the example set forth above in Table 1, each potential output result (e.g., score) is associated with a corresponding predetermined feedback (e.g., insertion of the adult toy 1 to a certain depth, with reference to a maximum insertion depth, and/or an insertion time). The values given in Table 1 are exemplary, and can be modified as appropriate based on the capabilities of the adult toy 1 and/or adjusted by the model M as desired. Further, the values can be adjusted in accordance with a magnitude of the tip (input parameter) input by the viewer V, as appropriate.

The first interface I1 may be configured to provide the viewer V with the title 40 of the game of chance to be played, a prompt 41 prompting the viewer V to tip a predetermined number of tokens (e.g., 20 tokens) to participate in the game of chance, and a graphic and/or animation 42 associated with the game of chance. The first interface I1 may also provide the above-described information provided in Table 1 regarding the potential output results of the game of chance and their associated predetermined feedbacks.

Figure 7:
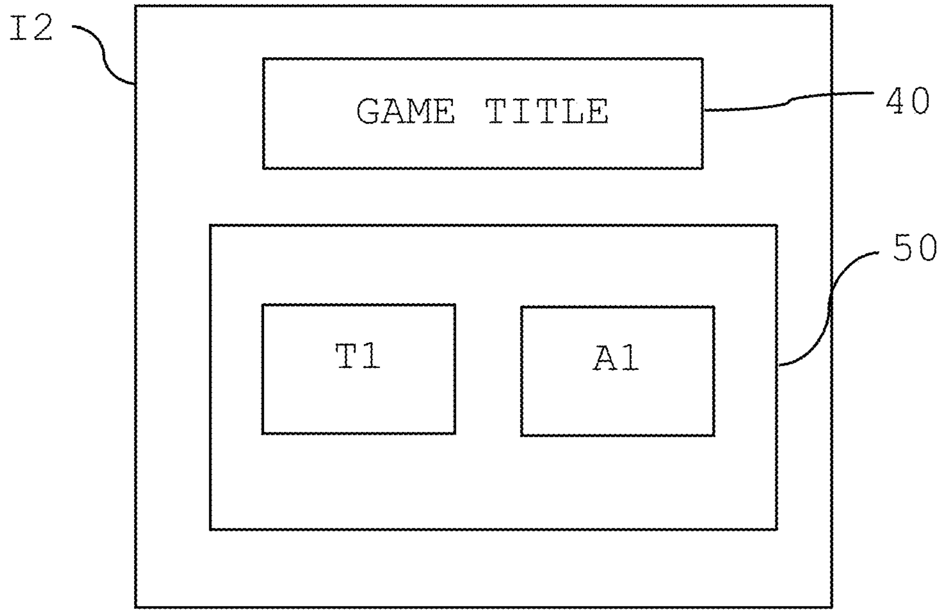
FIG. 7 schematically illustrates a second interface provided by the system.

FIG. 7 schematically illustrates an example of the display components included in the second interface I2 provided to the viewer V by the system 100 after receiving input of the input parameter from the viewer V, and obtaining the corresponding output result(s). For example, the second interface I2 may be configured to provide the viewer V with the title 40 of the game of chance, and a result display section 50 in which a target result T1 and an actual result A1 are displayed.

The target result T1 is displayed in the second interface I2 to visually convey information regarding a target value of a predetermined feedback associated with the output result of the game of chance (e.g., bowling game) obtained based on the parameter input by the viewer V. For example, with reference to Table 1 set forth above, the target result T1 may illustrate information regarding the target depth associated with the obtained output result (i.e., the target depth to which the model M should insert the toy into their body, based on the output result of the game of chance). The actual result A1 is displayed in the second interface I2 to visually convey information regarding an actual state of the predetermined feedback. For example, the actual result A1 may illustrate information regarding an output obtained from the sensor section 4 provided in the adult toy 1 during operation of the adult toy 1 by the model. In another modification, the actual result can be other toy-related information fed back by the adult toy 1 without use of the sensor section 4 (e.g., information regarding an amount or color of light output from the adult toy 1, or other operational information, which is not dependent upon sensor output), in a case in which the adult toy 1 is not provided with a sensor section 4. The target result T1 and the actual result A1 may be illustrated schematically, and may be displayed either separately or simultaneously. For example, the actual result A1 may be displayed superimposed over the target result T1, in a manner such that the target result T1 and the actual result A1 are distinguishable from each other (e.g., by displaying the actual result A1 and the target result T1 in different colors, shades, patterns, etc.).

Figure 8A:
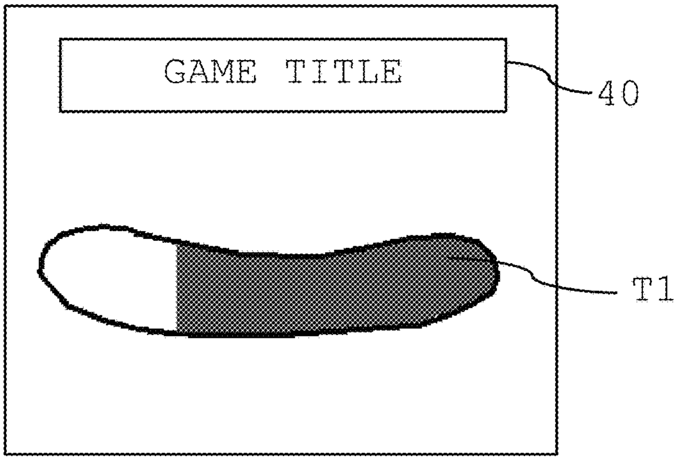
FIGS. 8A-8C illustrate exemplary second interfaces provided by the system during the online streaming video session.
Figure 8B:
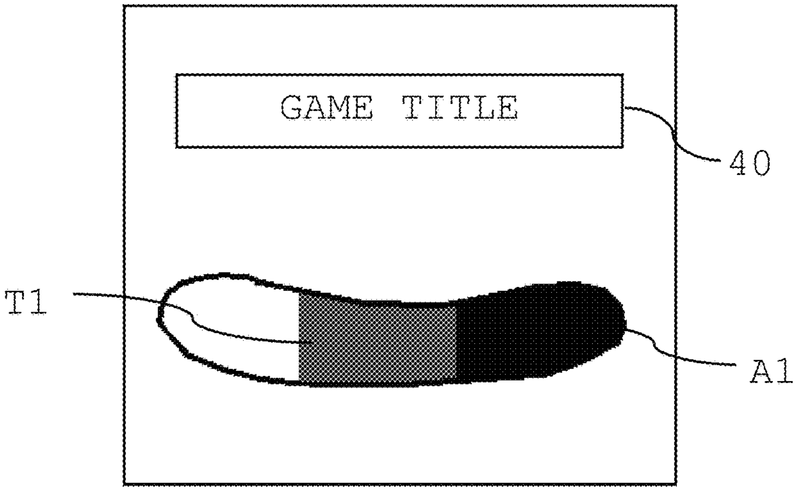
Figure 8C:
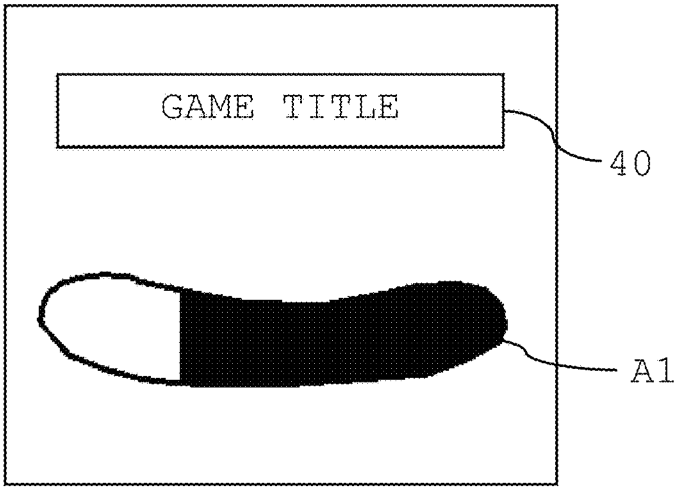

FIGS. 8A-8C illustrate exemplary second interfaces I2 provided to the viewer V in a case in which a target result T1 of 3/4 depth insertion is obtained based on the parameter input by the viewer V. FIG. 8A shows the target result T1. FIG. 8B shows the actual result A1 superimposed over the target result T1, based on output from the sensor section 4 of the adult toy 1 in real time. In the example of FIG. 8B, the model M has inserted the adult toy 1 to about ½ of the target result T1. The example of FIG. 8C shows a situation in which the actual result A1 fully overlaps with the target result T1, representing in a case in which an actual amount by which the model M has inserted the adult toy 1 coincides with the target result T1.

Figure 9A:
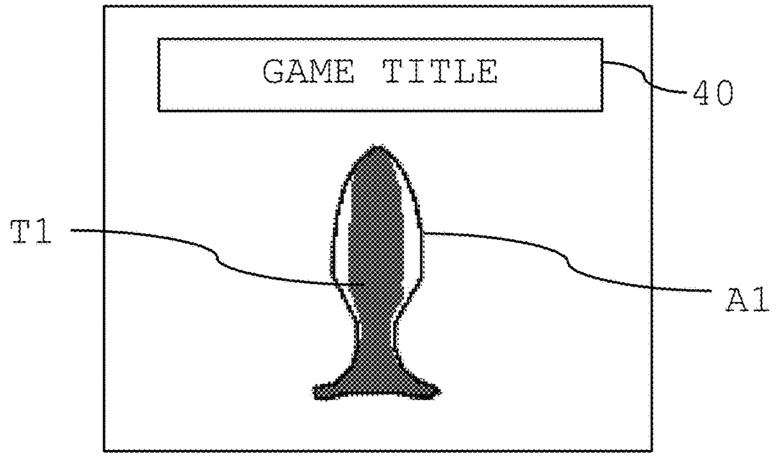
FIGS. 9A-9C illustrate alternate exemplary second interfaces provided by the system during the online streaming video session.
Figure 9B:
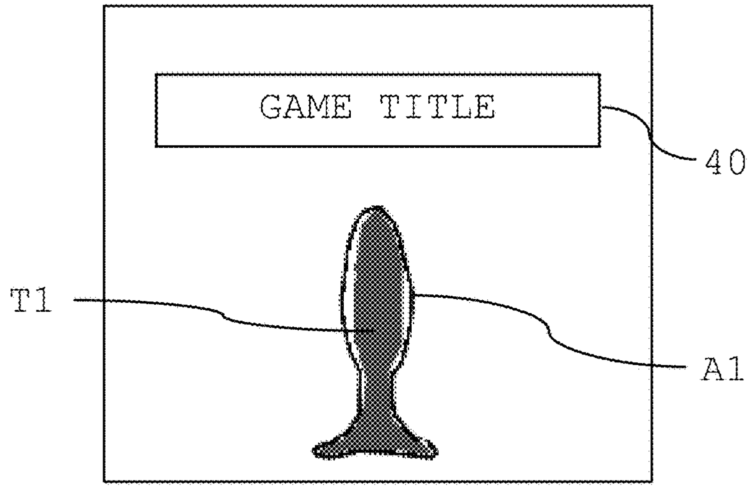
Figure 9C:
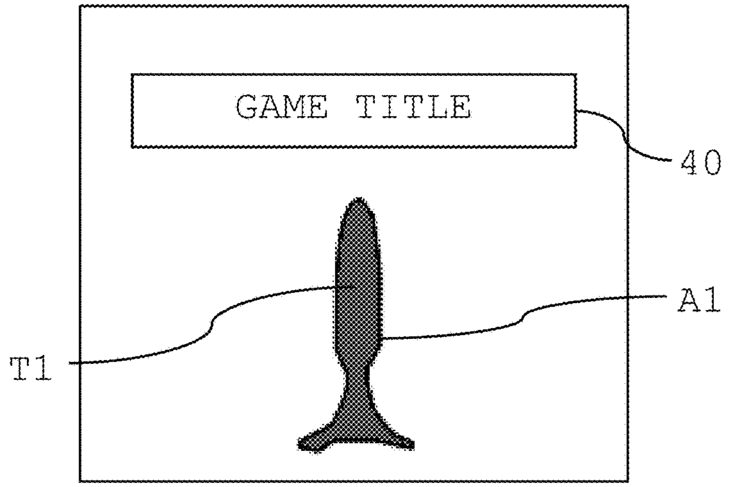

FIGS. 9A-9C illustrate alternate exemplary second interfaces I2 provided to the viewer V in a case in which the target result T1 is not a depth of insertion, but an amount of pressure applied to the adult toy 1 by the body part of the model M into which the adult toy 1 is inserted (e.g., in a case in which the adult toy 1 is configured as an inflatable plug having pressure sensors included in the sensor section 4 thereof, by which the applied pressure may be gauged).

That is, as shown in FIGS. 8A-8C and 9A-9C, while the model M is performing an act (predetermined feedback) that is associated with the obtained output result (e.g., insertion of the adult toy 1 to a certain depth, or constriction of the adult toy 1 by a certain amount) and a current state thereof is being displayed by the actual result A1 in the second interface I2, the server 30 makes a comparison between the target result T1 and the actual result A1 to determine whether or not the actual result A1 matches the target result T1. For example, the server 30 may obtain sensor data from the sensor section 4 of the adult toy 1 during use, and compare the values obtained from the sensor data with predetermined values associated with the target result T1. These predetermined values may be stored in the memory 32, for example. The second interface I2 performs display in accordance with a result of this comparison; for example, as discussed above with respect to FIGS. 8A-8C and 9A-9C, the amount of coincidence between the actual result A1 and the target result T1 is displayed visually; however, these data may be displayed textually.

Further, the server 30 may be configured so as to take a specific action in the event that it is determined, as a result of the above-described comparison, that the target result T1 and the actual result A1 match. For example, the model may be awarded an amount of tokens corresponding to the input parameter in response to a determination that the target result T1 and the actual result A1 match. The system may further be configured such that, in the event that no match is detected within the time allotted, an amount of tokens corresponding to the input parameter (e.g., the viewer's original tip used to engage in the game of chance) is returned to the viewer.

Figure 10A:
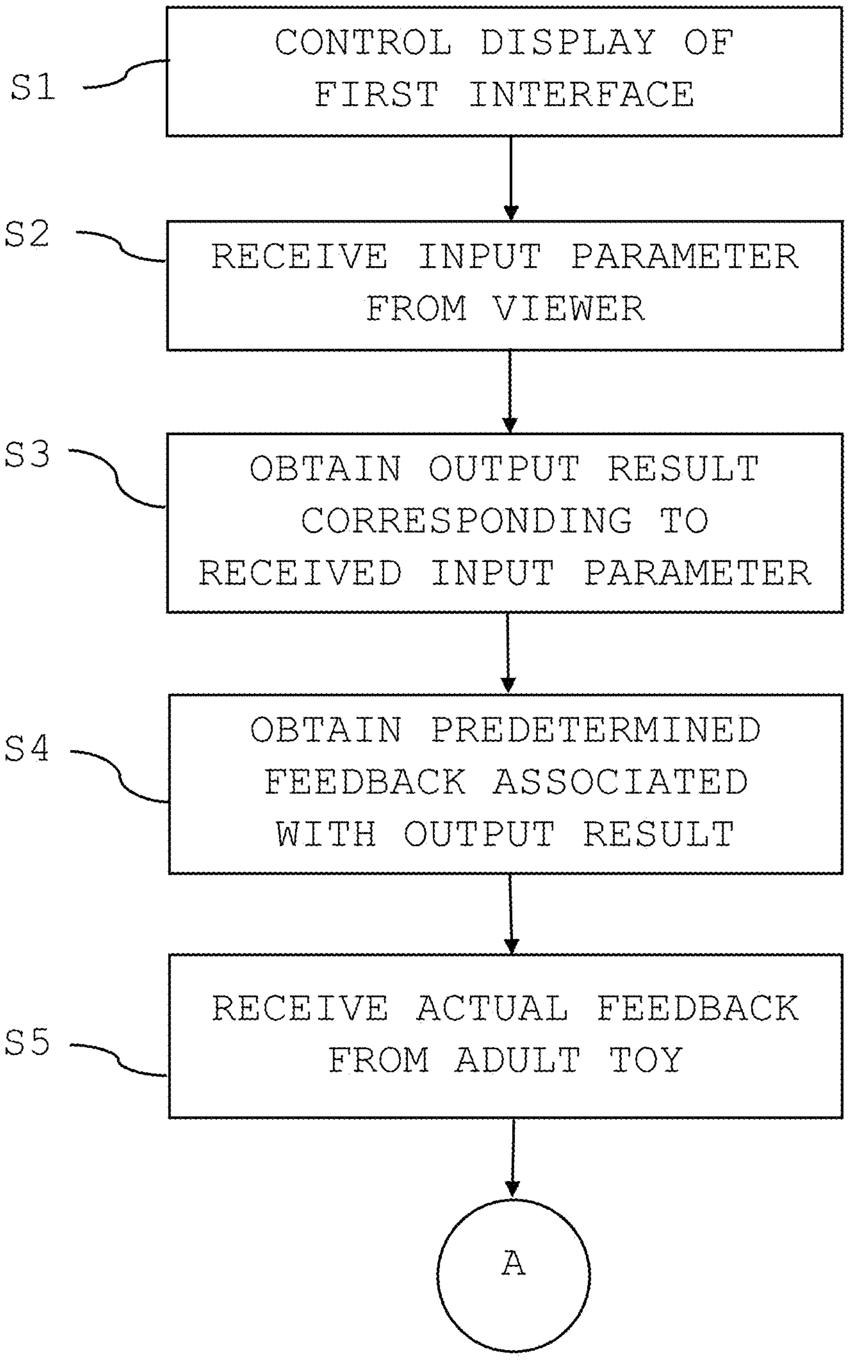
FIGS. 10A and 10B are flow charts illustrating a flow of control processing carried out in the system.
Figure 10B:
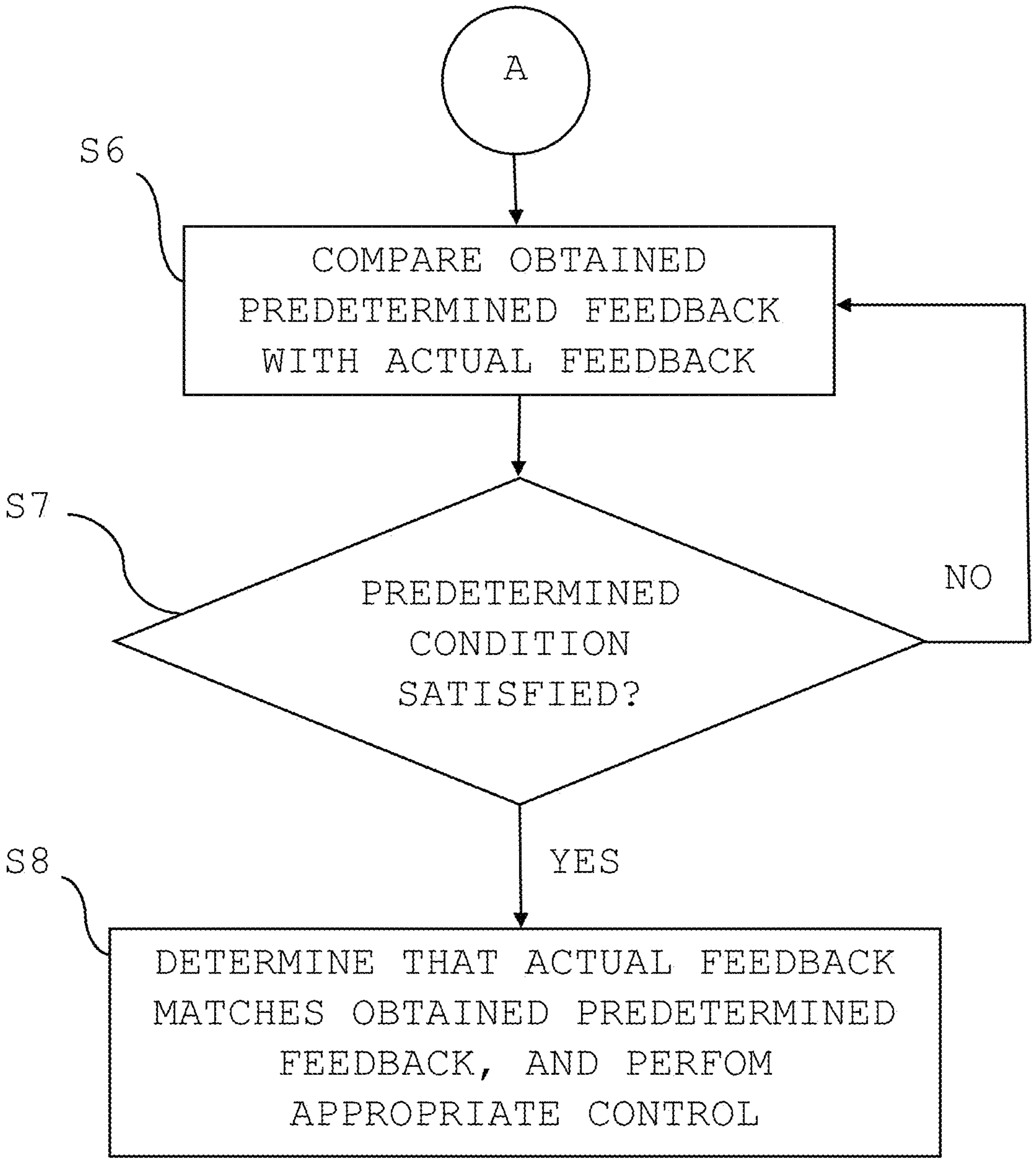

An example of operation of the system 100 will now be discussed with reference to FIGS. 10A and 10B. FIGS. 10A and 10B illustrate a flow chart of processing executed under control of the CPU 31 of the server 30. In an embodiment, the CPU 31 executes the processing described below under control of a program stored in the memory 33. FIGS. 10A and 10B will be described with respect to the above-described example of a bowling game as the game of chance, but a similar process is performed for the other games of chance which the server 30 is configured to provide.

As illustrated in FIG. 10A, in step S1, the server 30 controls display of the above-described first interface I1 at the second terminal 20, or at both of the first terminal 10 and the second terminal 20, during an online video streaming session hosted by the model M.

In step S2, the server 30 receives an input parameter input by the viewer V via the first interface I1 to participate in a game of chance. In the example discussed herein, the viewer V inputs a tip of 20 tokens as the input parameter; however, the specific value of the tip is not limited and may be set as appropriate.

In step S3, the server 30 obtains an output result corresponding to the input parameter input by the viewer V. In particular, the CPU 31 of the server 30 may operate under control of the program stored in the memory 32 so as to randomly generate one of a plurality of predetermined output results in response to receiving the input parameter. For example, when the game of chance is the above-described bowling game, the server 30 obtains a result of 1 pin, 2 pins, 3 pins, 4 pins, 5 pins, or 6 pins, after the input parameter is received.

In step S4, the server 30 obtains at least one corresponding predetermined feedback associated with the obtained output result, with reference to the information contained in Table 1 (discussed above).

In step S5, the server 30 receives actual feedback sent from the adult toy 1 in response to manipulation of the adult toy 1 by the model M. In particular, the server 30 informs the model M of the predetermined feedback associated with the output result obtained in step S4, in response to which the model M begins manipulation of the adult toy 1. During the manipulation of the adult toy 1 by the model M, sensor data output from the sensor section 4 included in the adult toy 1 is provided to the server 30 as the actual feedback.

In step S6, the server 30 compares the predetermined feedback associated with the output result obtained in step S4 with the actual feedback received from the adult toy 1 in step S5, during the manipulation of the adult toy 1 by the model M. For example, as discussed above with respect to FIGS. 8A-8C and 9A-9C, the server 30 determines whether the actual feedback received from the adult toy 1 matches/coincides with the predetermined feedback associated with the obtained output result.

As shown in FIG. 10B, in step S7, the server 30 determines whether a result of the comparison performed in step S6 satisfies a predetermined condition. In an embodiment, the predetermined condition is a condition whereby the actual feedback received from the adult toy 1 matches/coincides with the predetermined feedback associated with the obtained output result.

If a result of the determination in step S7 is "NO," the flow returns to step S6. If a result of the determination in step S7 is "YES," the server 30 determines that the manipulation of the adult toy 1 by the model M successfully matches the output result, and processing continues to step S8.

In step S8, the server 30 performs control as appropriate in accordance with the determination that the manipulation of the adult toy 1 by the model M successfully matches the output result. For example, as discussed above with respect to FIGS. 8A-8C and 9A-9C, the server 30 may award the model M an amount of virtual tokens corresponding to the input parameter when the manipulation of the adult toy 1 by the model M successfully matches the output result.

While the features of FIGS. 10A and 10B have been described as being performed under control of the server 30, it is also possible for the first terminal 10 and the second terminal 20 to execute this control either singly or in combination.

Further, in the embodiment discussed above, the input parameter (tip) input by the viewer V is used to engage with the game of chance, to obtain an output result (and associated predetermined feedback). In an alternate embodiment, the user may be provided the ability to engage in the game of chance without requiring input of the input parameter. In yet another alternate embodiment, the output result is obtained directly in proportion to a magnitude of the input parameter. In this modification, an input parameter of a first amount (e.g., 11-20 tokens) generates an output result of "1 pin," an input parameter of a second amount higher than the first amount (e.g., 21-30 tokens) generates an output result of "2 pins," and so on. These results can be associated with the same output results described above with respect to Table 1, or with other appropriate output results.

In a further modification of the above-described embodiment, the magnitude of the input parameter may be used to determine which one of a plurality of different possible games of chance the viewer will engage with. For example, an input parameter of 1-10 tokens may enable the user to engage in roulette as the game of chance, an input parameter of 11-20 tokens may enable the user to engage in the above-described bowling game, an input parameter of 21-30 tokens may enable the user to engage in a dice game, etc.

The system, method, and non-transitory computer-readable recording medium according to an embodiment of the invention as described above achieves an improvement over conventional technology by extending hardware capabilities of an adult toy 1 operated by a model M to viewers of an online video stream hosted by the model M, and enabling a viewer V to interact with and/or control operation/manipulation the adult toy 1 operated by the model M by engaging with a virtual game of chance, thereby realizing new ways of interaction and improved mutual enjoyment between the model M and the viewer V during the course of the online video streaming session.

It will be apparent to those skilled in the art that various modifications and variations can be made to the system and method described herein. Additional embodiments will be apparent to those skilled in the art from consideration and/or practice of the instant disclosure. It is intended that the specification and examples provided herein be considered as exemplary only, with the true scope of the invention being described by the appended claims.

What is claimed is:

1. An online entertainment system, comprising:

a memory; and a hardware processor configured to, under control of a program stored in the memory, execute processes comprising:

determining at least one predetermined feedback based on an input parameter;

receiving actual feedback sent from an adult toy in response to manipulation of the adult toy by a first user;

comparing (i) the at least one predetermined feedback and (ii) the actual feedback received from the adult toy, and determining whether a result of the comparing satisfies a predetermined condition; and in response to determining that the result of the comparing satisfies the predetermined condition, determining that the manipulation of the adult toy successfully conforms to the input parameter.

2. The system of claim 1, wherein:

the hardware processor is further configured to receive the input parameter from a second user, and the input parameter is associated with a value of a virtual currency or a virtual gift.

3. The system of claim 1, wherein the predetermined feedback is associated with at least one of (i) a predetermined duration of time, (ii) a predetermined intensity, and (iii) a predetermined depth, of a specific act manipulating the adult toy.

4. The system of claim 1, wherein the comparing includes:

displaying a first visual representation of the predetermined feedback; and displaying a second visual representation of the actual feedback.

5. The system of claim 4, wherein displaying the first visual representation of the predetermined feedback and displaying the second visual representation of the actual feedback comprise displaying, as the first and the second visual representation, an animation simulating the manipulation of the adult toy based on the predetermined feedback and the actual feedback.

6. The system of claim 5, wherein the displaying the animation simulating the manipulation of the adult toy comprises:

representing the predetermined feedback as a first layer of an animation corresponding to the adult toy;

representing the actual feedback as a second layer superimposed on the first layer; and indicating that the manipulation of the adult toy successfully matches the input parameter by representing the second layer entirely overlapping with the first layer.

7. The system of claim 4, wherein the first and second visual representations are displayed on each user device from which the input parameter has been received, or are displayed on a same user device.

8. The system of claim 1, wherein the processor is further configured to execute processes comprising:

in response to determining that the result of the comparing satisfies the predetermined condition, providing a reward to the first device, wherein the reward comprises a virtual currency or a virtual gift corresponding to the input parameter; or in response to determining that the result of the comparing does not satisfy the predetermined condition, returning the virtual currency or the virtual gift corresponding to the input parameter to a second user from which the input parameter was received.

9. The system of claim 1, wherein:

the adult toy comprises at least one sensor, and the actual feedback comprises sensing data detected by the at least one sensor while the adult toy is being manipulated by the first user in real time, the at least one sensor comprises at least one of a tactile sensor, a pressure sensor, a depth sensor, a thermometer and an acceleration sensor, and the sensing data includes at least one of tactile data, pressure data, depth data, temperature data, reciprocating speed data, and data regarding a number of reciprocations.

10. The system of claim 1, wherein the manipulation of the adult toy by the first user comprises insertion of the adult toy into a body part of the first user or insertion of a body part of the first user into the adult toy.

11. An online entertainment method in a system comprising an operable adult toy and a hardware processor, the method being executed by the hardware processor, and the method comprising:

determining at least one predetermined feedback based on an input parameter;

receiving actual feedback sent from an adult toy in response to manipulation of the adult toy by a first user;

comparing (i) the at least one predetermined feedback and (ii) the actual feedback received from the adult toy, and determining whether a result of the comparing satisfies a predetermined condition; and in response to determining that the result of the comparing satisfies the predetermined condition, determining that the manipulation of the adult toy successfully conforms to the input parameter.

12. The method of claim 11, further comprising receiving the input parameter from the first user, wherein:

the input parameter is associated with a value of a virtual currency or a virtual gift.

13. The method of claim 11, wherein the predetermined feedback is associated with at least one of (i) a predetermined duration of time, (ii) a predetermined intensity, and (iii) a predetermined depth, of a specific act manipulating the adult toy.

14. The method of claim 11, wherein the comparing includes:

displaying a first visual representation of the predetermined feedback; and displaying a second visual representation of the actual feedback.

15. The method of claim 14, wherein displaying the first visual representation of the predetermined feedback and displaying the second visual representation of the actual feedback comprise displaying, as the first and the second visual representation, an animation simulating the manipulation of the adult toy based on the predetermined feedback and the actual feedback.

16. The method of claim 15, wherein the displaying the animation simulating the manipulation of the adult toy comprises:

representing the predetermined feedback as a first layer of an animation corresponding to the adult toy;

representing the actual feedback as a second layer superimposed on the first layer; and indicating that the manipulation of the adult toy successfully matches the input parameter by representing the second layer entirely overlapping with the first layer.

17. The method of claim 14, wherein the first and second visual representations are displayed on each user device from which the input parameter has been received, or are displayed on a same user device.

18. The method of claim 11, further comprising:

in response to determining that the result of the comparing satisfies the predetermined condition, providing a reward to the first user, wherein the reward comprises a virtual currency or a virtual gift corresponding to the input parameter; or in response to determining that the result of the comparing does not satisfy the predetermined condition, returning the virtual currency or the virtual gift corresponding to the input parameter to the second user from which the input parameter was received.

19. The method of claim 11, wherein the manipulation of the adult toy by the first user comprises insertion of the adult toy into a body part of the first user or insertion of a body part of the first user into the adult toy.

20. A non-transitory computer-readable storage medium having a program stored thereon, the program being executable to control a processor to execute processes comprising:

determining at least one predetermined feedback based on an input parameter;

receiving actual feedback sent from an adult toy in response to manipulation of the adult toy by a first user;

comparing (i) the at least one predetermined feedback and (ii) the actual feedback received from the adult toy, and determining whether a result of the comparing satisfies a predetermined condition; and in response to determining that the result of the comparing satisfies the predetermined condition, determining that the manipulation of the adult toy successfully conforms to the input parameter.

* * * * *